H. B. PAINE.
ANTISLIPPING ATTACHMENT FOR HORSESHOES.
APPLICATION FILED JUNE 7, 1913.
1,086,207.
Patented Feb. 3, 1914.
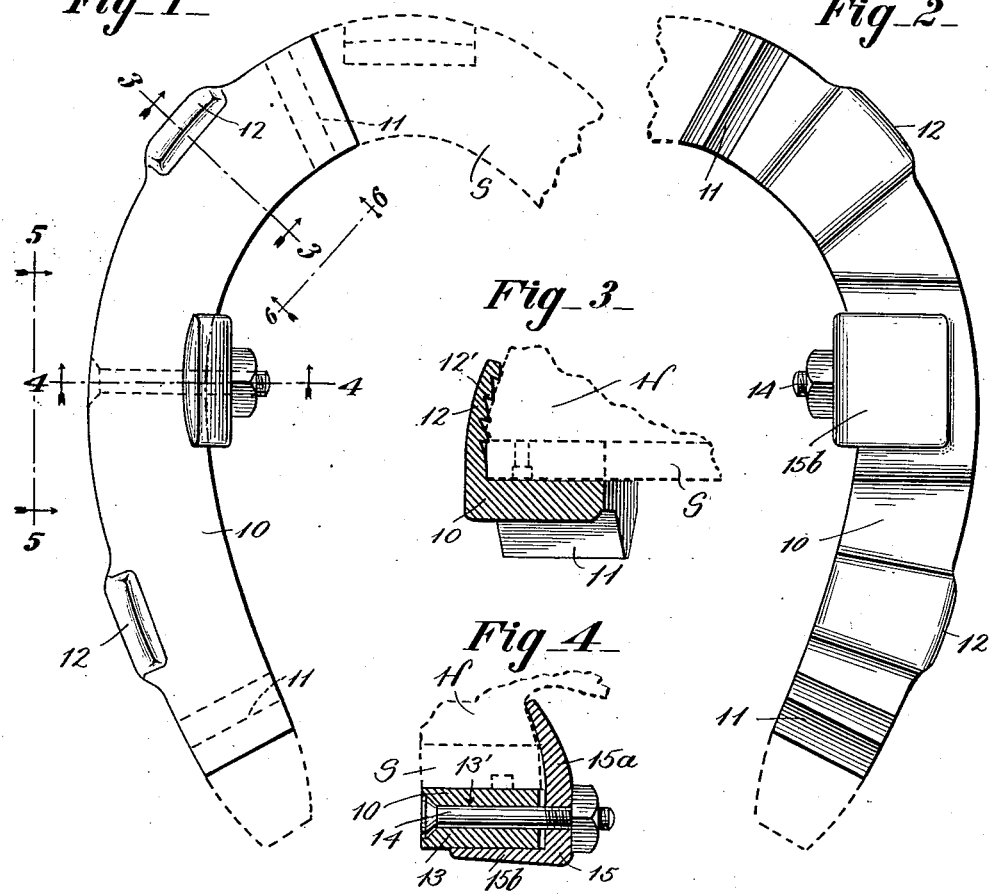
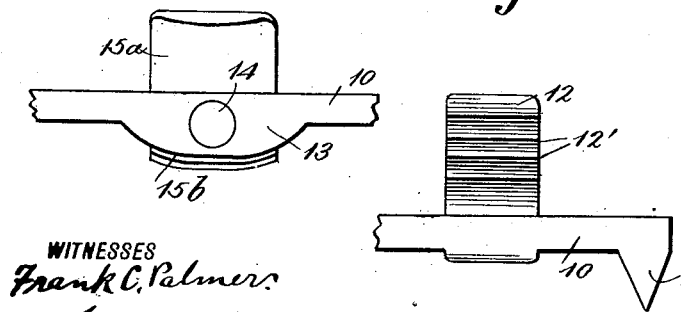
WITNESSES
INVENTOR
Harry B. Paine
BY
ATTORNEYS

UNITED STATES PATENT OFFICE.

HARRY BENJAMIN PAINE, OF PATCHOGUE, NEW YORK.

ANTISLIPPING ATTACHMENT FOR HORSESHOES.

1,086,207.	Specification of Letters Patent.	Patented Feb. 3, 1914.

Application filed June 7, 1913. Serial No. 772,299.

*To all whom it may concern:*

Be it known that I, HARRY B. PAINE, a citizen of the United States, and a resident of Patchogue, in the county of Suffolk and State of New York, have invented a new and Improved Antislipping Attachment for Horseshoes, of which the following is a full, clear, and exact description.

This invention relates to farriery and has particular reference to devices adapted to be detachably connected to horses' hoofs shod with ordinary or conventional forms of shoes.

Among the objects of the invention is to provide an attachment for one side of a horseshoe, the same being adapted to be removably clamped thereto by a simple and easily manipulated means, said device to be equipped with any suitable form of calks depending upon the nature of the weather or the conditions of the ground to be traversed. It will be understood that two of these devices will be employed upon each horseshoe.

A further object of the invention is to provide an attachment of such nature that when a pair of them are applied to a horseshoe they will fit substantially such shoe if it should be slightly larger or slightly smaller than a shoe made to exactly conform to the outlines of said attachments. In other words, while horseshoes as usually made and sold are of about ten different sizes, my attachments may be made in about half that number of sizes and yet be adaptable to any size of horseshoe.

A further object of the invention is to provide an attachment for horseshoes which will coöperate not only with the usual horseshoe, but also will grip to a certain extent the rim of the horse's hoof above said shoe.

The foregoing and other objects of the invention will hereinafter be more fully described and claimed and illustrated in the drawings forming a part of this specification in which like characters of reference indicate corresponding parts in all the views, and in which—

Figure 1 is a plan view of one of my attachments indicating in dotted lines the horseshoe to which the attachment is secured; Fig. 2 is a bottom plan view of the same; Fig. 3 is a transverse section on the line 3—3 of Fig. 1; Fig. 4 is a similar view on the line 4—4 of Fig. 1; Fig. 5 is a partial side elevation as viewed from the line 5—5 of Fig. 1; Fig. 6 is a side elevation of one end of the device substantially as will be seen from the line 6—6 of Fig. 1; and Fig. 7 is a perspective detail of the clamp.

The several parts of the device may be made of any suitable materials, and the relative sizes and proportions of the same may be varied to a considerable extent without departing from the spirit of the invention hereinafter more fully set forth and specifically claimed.

As herein shown, the preferred form of the device in plan is that conforming substantially to a portion of an ordinary horseshoe and little less than one half in extent. While the drawings illustrate only one attachment, it will be understood that they will be made in pairs as rights and lefts. The attachment, therefore, may be described as comprising a plate or body 10 substantially flat in a horizontal plane and adapted to fit substantially against the bottom of one side of a horseshoe indicated in dotted lines at S. Said plate 10 may be provided with any suitable form or construction of calks herein shown at 11 as two in number and of triangular form in cross section and having sharp edges. These calks 11 are shown as being made integral with the plate, but as above intimated, I do not wish to be limited to any particular form of calk.

Secured rigidly in any suitable way to one edge of the plate and extending upwardly therefrom are gripping tongues 12, shown herein as being connected with the outer edge of the plate. These tongues 12 extend vertically into engagement with the outer edge of the shoe S and extend thence inwardly, having their upper curved ends in engagement with the hoof H. These tongues may, if desired, be provided with teeth or serrations 12′ to increase the gripping effect.

At substantially its middle the plate is provided with an enlargement 13 having a transverse bore 13 in which is seated an attaching means shown as a bolt 14. A movable clamp member 15, shown in detail in Figs. 4 and 7, coöperates with the edge of the plate opposite the two fixed tongues 12 and substantially midway between them. In this instance said clamp 15 is applied to the inner edge of the plate and comprises two principal parts, namely, an upwardly projecting hook 15ª, and a substantially horizontal outwardly projecting foot 15ᵇ. The hook portion is shown provided with a hole 15ᶜ through which is passed the bolt 14 and whereby the clamp is drawn in the gripping action toward the plate and the shoe above it. In other words, the hook 15ª is intended to grip the shoe in opposition to the gripping effect of the tongues 12 on the opposite sides thereof. The upper end or point of the hook extends beyond the inner edge of the shoe and may, under certain instances, coöperate with the hoof, though the primary grip will be upon the shoe. The foot 15ᵇ being concave is intended to snugly embrace the convex bottom of the enlargement 13 of the plate, and therefore torsional displacement of the hook around a vertical axis is substantially prevented while in use or during the process of drawing the parts together through the bolt 14. It will be observed, therefore, especially in Fig. 7, that said clamp member is so formed as to be convex in horizontal section where it engages or approaches the inner edge of the plate 10 and the inner edge of the shoe S, and is concave in vertical section in order to provide the hook for effective engagement with said shoe, as shown in Fig. 4. Any suitable means may be employed to make the bolt secure in its fastening, and as shown, it is a comparatively simple matter for a farrier or any driver to apply a pair of these attachments to a hoof shod with an ordinary horseshoe. They, therefore, may be used temporarily when needed, and then removed, if desired.

These devices are comparatively light, adding little weight to the horses' feet.

Having thus described my invention, I claim as new and desire to secure by Letters Patent:

In combination with an ordinary horseshoe, an anti-slipping attachment therefor comprising a substantially flat plate conforming to a part of said shoe, a pair of rigid tongues connected to and extending upwardly from one edge of said plate into engagement with the corresponding edge of the shoe, said plate having a convex enlargement formed on its bottom between said tongues and said enlargement having a hole therethrough, the axis of the hole being transverse to the plate, a clamp member on the opposite edge of the plate, said member including an upwardly projecting hook adapted to engage the adjacent edge of the shoe and also including an integral foot portion projecting horizontally beneath said plate and being concave to conform to said convex enlargement, and a bolt passing through said hole and said clamp member to draw the clamp member horizontally toward the shoe and plate to cause said tongues and said hook to firmly grip the plate to the shoe.

In testimony whereof I have signed my name to this specification in the presence of two subscribing witnesses.

HARRY BENJAMIN PAINE.

Witnesses:
 HENRY WILLIAM PAINE,
 EDWARD WILLSON LATHAM.

---

Copies of this patent may be obtained for five cents each, by addressing the "Commissioner of Patents, Washington, D. C."